United States Patent [19]
Inagaki et al.

[11] Patent Number: 5,988,769
[45] Date of Patent: Nov. 23, 1999

[54] BRAKE SYSTEM FOR VEHICLE

[75] Inventors: Hiromi Inagaki; Kazuhiko Mochizuki; Shinji Suto; Toshio Hayashi, all of Wako, Japan

[73] Assignee: Honda Giken Kogyo Kabushiki Kaisha, Tokyo, Japan

[21] Appl. No.: 08/620,208

[22] Filed: Mar. 22, 1996

[30] Foreign Application Priority Data

Mar. 23, 1995 [JP] Japan .................................. 7-064589

[51] Int. Cl.$^6$ ...................................................... B60T 8/38
[52] U.S. Cl. ...................................................... 303/117.1
[58] Field of Search ........................... 303/117.1, 113.1, 303/113.2, 116.1, 119.1, 115.2, 901; 364/424.01, 426.01, 11.02, 11.03

[56] References Cited

U.S. PATENT DOCUMENTS

| 4,715,666 | 12/1987 | Farr | 303/116.4 |
| 5,372,412 | 12/1994 | Yagi | 303/115.2 |
| 5,431,489 | 7/1995 | Lee | 303/115.4 |
| 5,435,636 | 7/1995 | Sasanoi | 303/116.1 |

FOREIGN PATENT DOCUMENTS 5-65060  3/1993  Japan .

*Primary Examiner*—Christopher P. Schwartz
*Assistant Examiner*—C. T. Bartz
*Attorney, Agent, or Firm*—Nikaido Marmelstein Murray & Oram LLP

[57] ABSTRACT

A brake system for a vehicle includes a liquid pressure generating device for generating a liquid pressure for braking dependent upon a manual operation, an actuator for generating a liquid pressure for braking dependent upon an electrical command signal, and an electromagnetic switchover valve which is switchable between a first state in which a wheel brake is connected to the liquid pressure generating device upon deenergization of the electromagnetic switchover valve, and a second state in which the wheel brake is connected to the actuator upon energization of the electromagnetic switchover valve. The brake system further includes a controller. The controller determines whether the regulation of braking force is necessary depending upon the behavior of the vehicle or a wheel, determines an amount of braking force required to be generated by the brake, and determines an electrical command signal to be applied to the actuator, dependant upon the required amount of braking force, when the regulation of brake force is necessary. Further, the controller controls the switching operation of the electromagnetic switchover valve device between the first state in which the regulation of braking force is unnecessary, and the second state in which the regulation of braking force is necessary. The switching of states may be based upon an elapsed time or based upon equalizing pressures between the actuators and the liquid pressure generating device. Thus, it is possible to reduce the frequency of operation of each of the actuator and the electromagnetic switchover valve device and to eliminate the need for a stroke accumulator, thereby providing a simplified structure.

11 Claims, 3 Drawing Sheets

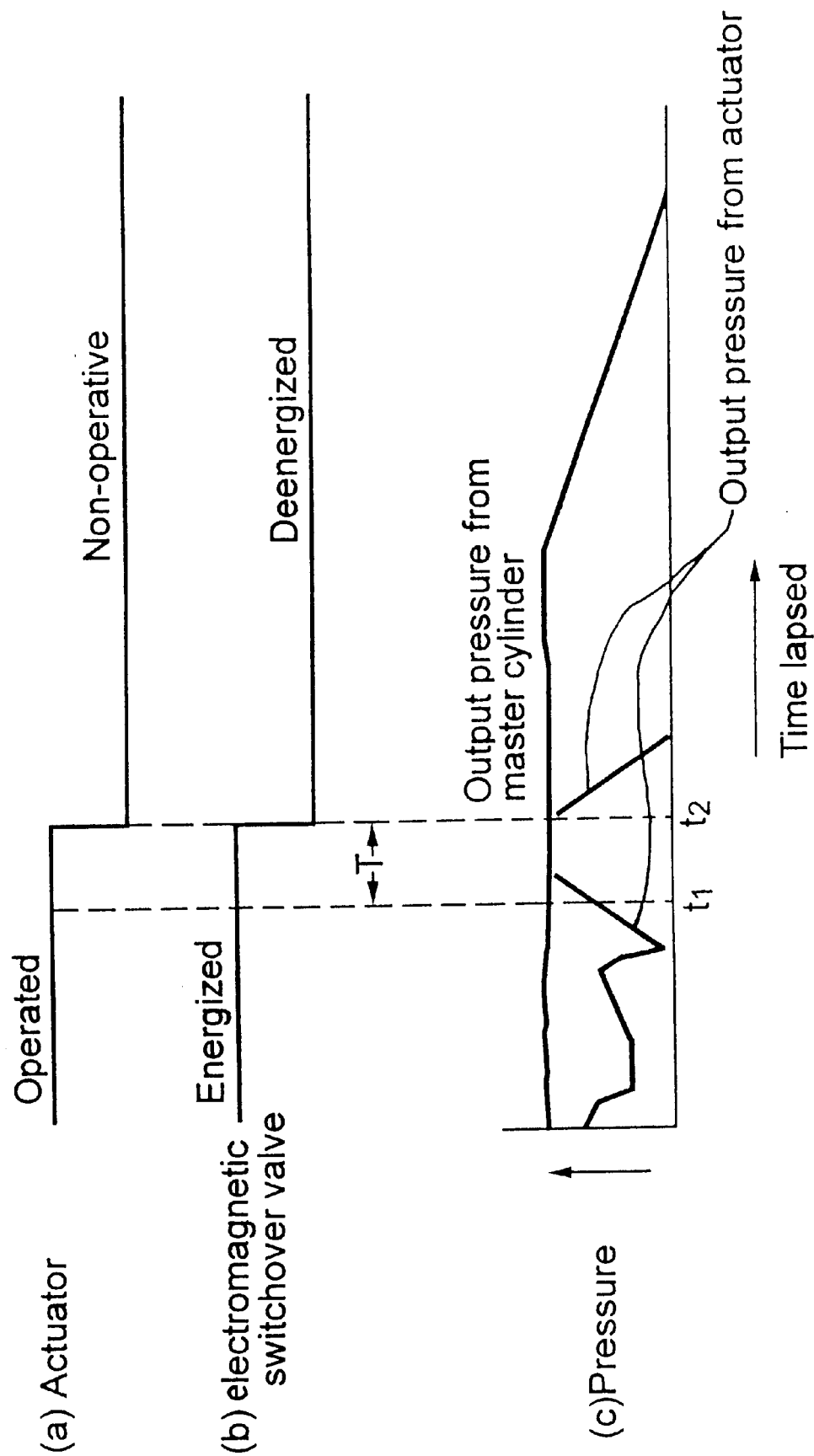

BRAKE SYSTEM FOR VEHICLE

BACKGROUND OF THE INVENTION

1. Field of the Invention

The present invention relates to a brake system for a vehicle, comprising a liquid pressure generating means for generating a liquid pressure dependent upon a manual operation, an actuator for outputting a liquid pressure dependent upon an electrical command signal applied thereto, and an electromagnetic switchover valve means which is switchable between a first state in which a wheel brake is connected to the liquid pressure generating means upon deenergization of the electromagnetic switchover valve means, and a second state in which the wheel brake is connected to the actuator upon energization of the electromagnetic switchover valve means.

2. Description of the Prior Art

In a brake system which is conventionally known, for example, from Japanese Patent Application Laid-Open No. 65060/93, when the operation of the actuator is normal, the electromagnetic switchover valve means is energized to connect the actuator to the wheel brake. When the operation of the actuator becomes abnormal, the electromagnetic switchover valve means is deenergized to connect a master cylinder serving as the liquid pressure generating means, to the wheel brake. In the normal state, braking pressure is provided by the actuator, and the output pressure from the master cylinder is used as a fail-safe. With such known system, however, during a normal braking, the actuator is normally in operation, and the electromagnetic switchover valve means is also energized, resulting in a higher frequency of operation of each of the actuator and the electromagnetic switchover valve means. Moreover, in a condition in which braking pressure is provided by the output pressure from the actuator, a stroke accumulator for accumulating output pressure from the master cylinder is required for the purpose of providing a braking feeling.

If there is a difference in pressure between the wheel brake and the master cylinder when the electromagnetic switchover valve means is switched from the state in which the actuator is connected to the wheel brake to the state in which the master cylinder is connected to the wheel brake, a sense of incompatibility due to a pressing-up or a kick-back of a brake pedal may be produced in response to the switching of the connected state.

SUMMARY OF THE INVENTION

It is a primary object of the present invention to provide a brake system for a vehicle, wherein the frequency of operation of both of the actuator and the electromagnetic switchover valve means is reduced, and the need for the stroke accumulator is eliminated, thereby providing a simplified structure.

It is another object of the present invention to provide a brake system for a vehicle, wherein the sense of incompatibility in braking is eliminated when the electromagnetic switchover valve means is switched from the state in which the actuator is connected to the wheel brake to the state in which the liquid pressure generating means is connected to the wheel brake.

To achieve the above objects, according to a first aspect and feature of the present invention, there is provided a brake system for a vehicle, comprising a liquid pressure generating means for generating a liquid pressure dependent upon a manual operation, an actuator for outputting a liquid pressure dependent upon receiving an electrical command signal, and an electromagnetic switchover valve means which is switchable between a first state in which a wheel brake is connected to the liquid pressure generating means upon deenergization of the electromagnetic switchover valve means, and a second state in which the wheel brake is connected to the actuator upon energization of the electromagnetic switchover valve means. The brake system further includes a controller, the controller determining whether the regulation of braking force is necessary depending upon the behavior of the vehicle or a wheel, and determining the electrical command signal to be applied to the actuator when the regulation of braking force is necessary. The controller controls the switching operation of the electromagnetic switchover valve means between the first state in which the regulation of braking force is unnecessary, and the second state in which the regulation of braking force is necessary.

With the first feature of the present invention, during normal braking wherein the braking force is not regulated, the output liquid pressure from the liquid pressure generating means is applied to the wheel brake. Thus, the frequency of operation of each of the actuator and the electromagnetic switchover valve means can be reduced, and the need for the stroke accumulator can be eliminated, leading to a simplified structure.

In addition, to achieve another object, according to a second aspect and feature of the present invention, there is provided a brake system for a vehicle, comprising a liquid pressure generating means for generating a liquid pressure dependent upon a manual operation, an actuator for outputting a liquid pressure dependent upon receiving an electrical command signal, and an electromagnetic switchover valve means which is switchable between a first state in which a wheel brake is connected to the liquid pressure generating means upon deenergization of the electromagnetic switchover valve means, and a second state in which the wheel brake is connected to the actuator upon energization of the electromagnetic switchover valve means. The brake system further includes a controller, the controller determining, when the actuator is to be operated and an electrical command signal to be applied to the actuator. The controller switches the electromagnetic switchover valve means into the second state, and when the operation of the actuator is completed, the controller applies a further electrical command signal for equalizing the output liquid pressure from the actuator to a detected value or an evaluated value of the output liquid pressure from the liquid pressure generating means at the time of completion of the actuator and then, switches the electromagnetic switchover valve means into the first state.

With the second feature of the present invention, when the electromagnetic switchover valve means is switched from the state in which the actuator is connected to the wheel brake, to the state in which the liquid pressure generating means is connected to the wheel brake, the liquid pressures in the wheel brake and the liquid pressure generating means are substantially equal to each other. Thus, it is possible to prevent the sense of incompatibility in braking from being produced due to the pressing-up or the kick-back of the brake pedal.

The above and other objects, features and advantages of the invention will become apparent from the following detail description of a preferred embodiment taken in conjunction with the accompanying drawings.

BRIEF DESCRIPTION OF THE DRAWINGS

FIG. 3 is a diagram showing a variation in liquid pressure produced by switching of the operation of the actuator and the electromagnetic switchover valve.

DESCRIPTION OF THE PREFERRED EMBODIMENT

The present invention will now be described by way of a preferred embodiment with reference to the accompanying drawings.

Figure 1:
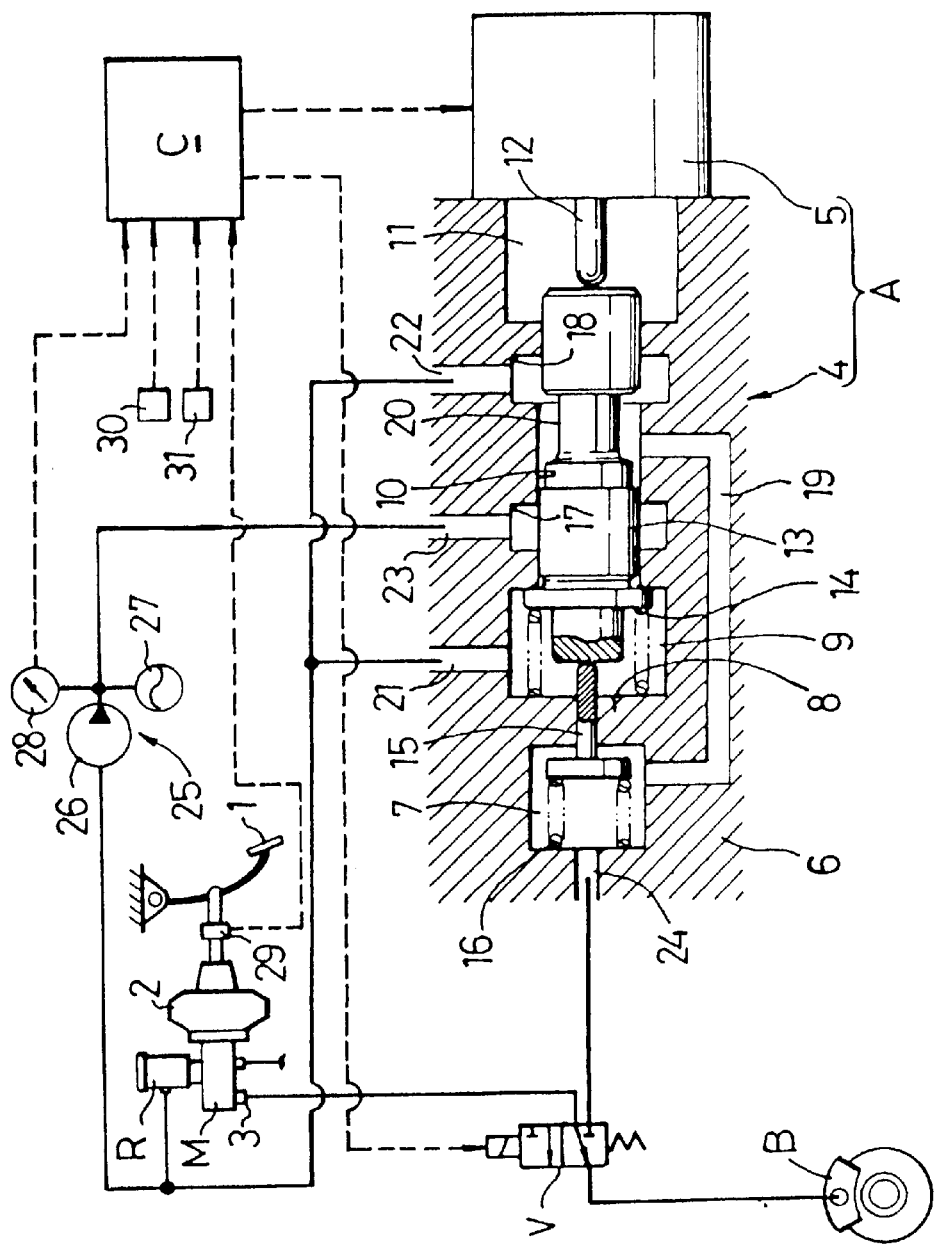
FIG. 1 is a diagrammatic illustration of the arrangement of a brake system for a vehicle according to the preferred embodiment of the present invention.

FIG. 1 shows a brake system for a vehicle according to a preferred embodiment of the present invention. The brake system includes: a master cylinder M which functions as a liquid pressure generating means which is capable of outputting a liquid pressure dependent upon a manual operation and an actuator A which outputs a liquid pressure dependent upon an electrical command signal applied thereto. A 3-port and 2-position electromagnetic switchover valve V functions as an electromagnetic switchover valve which is switchable between a first state in which a wheel brake B and the master cylinder M are interconnected upon deenergization of the electromagnetic switchover valve, and a second state in which the wheel brake B and the actuator A are interconnected upon energization of the electromagnetic switchover valve. A controller C controls the operation of the actuator A and the electromagnetic switchover valve V depending upon the behavior of the vehicle or the wheel.

The force of a brake pedal 1 is applied through a vacuum booster 2 to the master cylinder M, and a liquid pressure dependent upon the force on brake pedal 1 is outputted from an output port 3 of the master cylinder M.

The actuator A includes a control valve 4, and a linear solenoid 5.

The control valve 4 has a housing 6. The housing 6 includes a release chamber 9 having a partition wall 8 interposed between the release chamber 9 and the output chamber 7. A slide bore 10 is connected at one end thereof to the release chamber 9, and a working chamber 11 which has a diameter larger than that of the slide bore 10, is coaxially connected at one end thereof to the other end of the slide bore and opens at the other end thereof. The linear solenoid 5 has a driving rod 12 and is mounted to the housing 6 in such a manner that the driving rod 12 is coaxially disposed within the working chamber 11 to close the outer end of the working chamber 11.

A valve spool 13 is slidably received in the slide bore 10 with one end thereof facing the release chamber 9. In the release chamber 9, a return spring 14 is compressed between the one end of the valve spool 13 and the partition wall 8. Thus, the valve spool 13 is biased by a spring force of the return spring 14, such that the other end of the valve spool 13 is normally in abutment against the driving rod 12.

A reaction pin 15 is liquid-tightly and slidably mounted through the partition wall 8 and has a diameter smaller than that of the valve spool 13. A spring 16 is compressed between one end of the reaction pin 15 facing the output chamber 7 and the housing 6 and exhibits a spring force just sufficient to always bring the other end of the reaction pin 15 into abutment against the one end of the valve spool 13.

A first recess 17 on the side of the release chamber 9 and a second recess 18 on the side of the working chamber 11 are provided at an axial distance in the slide bore 10. A communication passage 19 is provided in the housing 6 between the first and second recesses 17 and 18, and has one end which opens into an inner surface of the slide bore 10. The other end of the communication passage 19 communicates with the output chamber 7. An annular groove 20 is provided in the valve spool 13 and adapted to bring the second recess 18 into communication with the communication passage 19, while bringing the first recess 17 out of communication with the communication passage 19, when the valve spool 13 is in a position as shown in FIG. 1, and to bring the first recess 17 into communication with the communication passage 19, while bringing the second recess 18 out of communication of the communication passage 19, when the valve spool 13 is advanced.

The housing 6 is provided with the following ports: first and second release ports 21 and 22 which lead to the release chamber 9 and the second recess 18, respectively; and input port 23 leading to the first recess 17; and an output port 24 leading to the output chamber 7. The first and second release ports 21 and 22 are in communication with a reservoir R mounted on with the master cylinder M, and the input port 23 is in communication with a liquid pressure supply source 25.

The liquid pressure supply source 25 includes a pump 26 for pumping a working liquid from the reservoir R, an accumulator 27 connected to the pump 26, and a pressure detector 28 for detecting a pressure in the accumulator 27. The liquid pressure supply source 25 is capable of normally supplying a constant liquid pressure.

The linear solenoid 5 provides an axial thrust dependent upon an input electrical quantity, to be applied from the driving rod 12 to the valve spool 13. Thus, by the axial thrust applied from the linear solenoid 5, the valve spool 13 is urged in a direction to bring the communication passage 19 and thus the output chamber 7 into communication with the first annular recess 17 and thus the input port 23. A spring force opposing the axial thrust is applied to the valve spool 13 by the return spring 14, and a reaction force from the reaction pin 15 is also applied to the valve spool 13 by the liquid pressure in the output chamber 7 which acts on the reaction pin 15 to oppose the axial thrust. In this manner, the valve spool 13 is moved within the slide bore 19 between the position in which it permits the output chamber 7 and thus the output port 24 to be put into communication with the second annular recess 18 and thus the second release port 22, and an advanced position in which it permits the output port 24 to be put into communication with the input port 23, so as to balance the thrust from the linear solenoid 5 and the spring force of the return spring 14 as well as the reaction force from the reaction pin 15. This causes a braking liquid pressure dependent upon an input electrical quantity received by the linear solenoid 5, to be outputted from the output port 24.

The switching operation of the electromagnetic switchover valve V and the operation of the actuator A are controlled by the controller C. Detection values which are detected by the pressure detector 28 of the liquid pressure supply source 25, a depressing-force detector 29 for detecting a depressing force on the brake pedal 1, a wheel speed detector 30, a lateral acceleration detector 31 and the like are inputted to the controller C.

Figure 2:
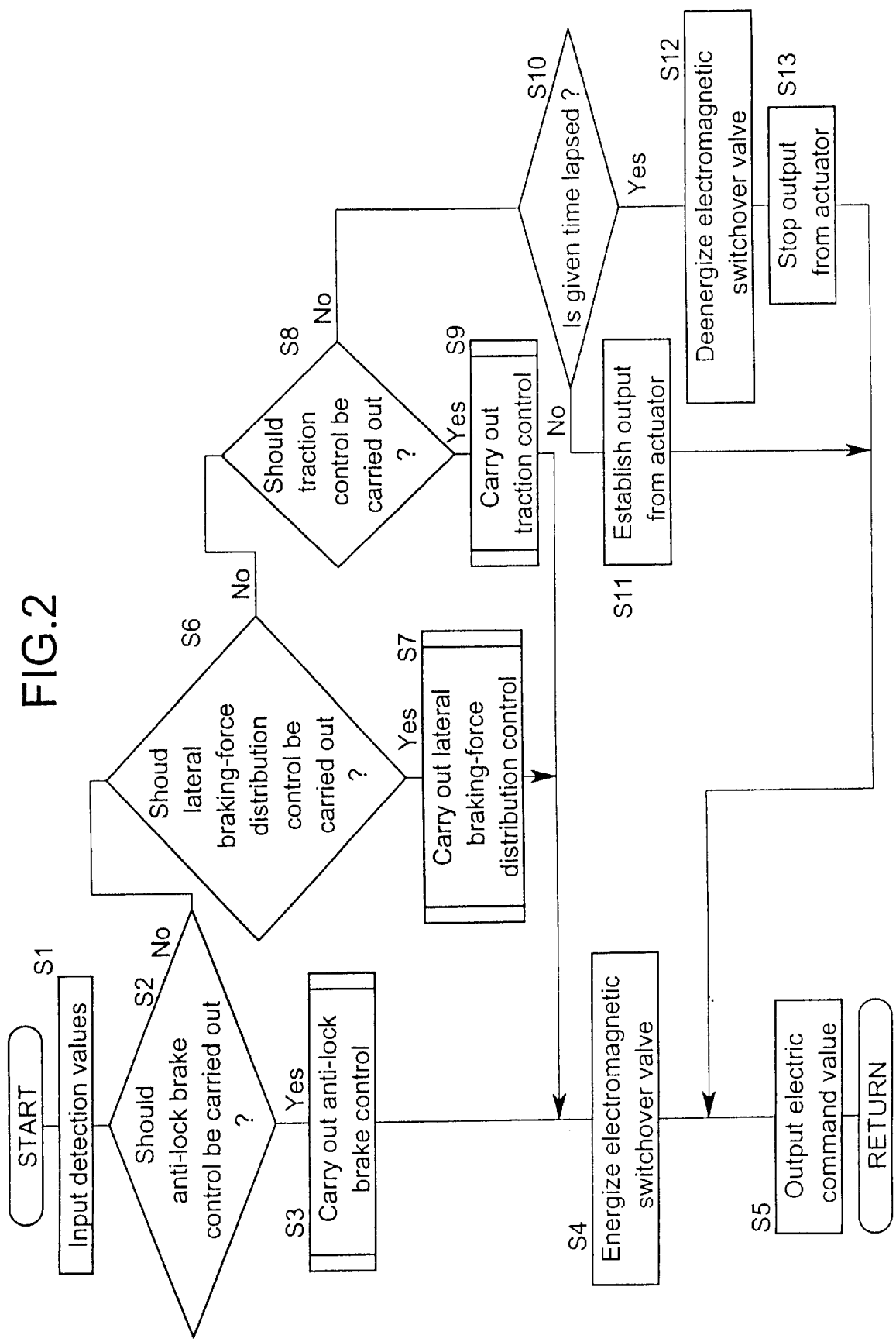
FIG. 2 is a flow chart showing a control procedure carried out by a controller.

A control procedure as shown in FIG. 2 is established in the controller C, and the operations of the electromagnetic switchover valve V and the actuator A are controlled according to the control procedure.

Referring to FIG. 2, at Step S1, the detection values from the detectors 28 to 31 are inputted. At Step S2, it is determined whether the vehicle is in a state in which an anti-lock brake control should be carried out. If the anti-lock brake control should be carried out, an electrical command signal to be applied in carrying out the anti-lock brake control, is calculated at Step S3. Thereafter, it is determined at Step S4 that the electromagnetic switchover valve V should be energized into the second state to connect the wheel brake B to the actuator A. At Step S5, the electrical command signal is applied to the actuator A.

If it is determined at Step S2 that the vehicle is not in the state in which the anti-lock brake control should be carried out, the processing is advanced from Step S2 to Step S6, at which it is determined whether the vehicle is in a state in which a lateral braking-force distribution control should be carried out. If it is determined that the vehicle is in the state in which the lateral braking-force distribution control should be carried out, an electrical command signal to be used in carrying out the lateral braking-force distribution control, is calculated at Step S7, then the control proceeds to Step S4.

If it is determined at Step S6 that the vehicle is not in the state in which the lateral braking-force distribution control should be carried out, the processing is advanced from Step S6 to Step S8, at which it is determined whether the vehicle is in a state in which a traction control for driven wheels should be carried out. If it is determined that the vehicle is in the state in which the traction control should be carried out, an electrical command signal to be used in carrying out the traction control is calculated at Step S9, then the control proceeds to Step S4.

In short, in Steps S2 to S9, in a condition in which the wheel brake B has been connected to the actuator A from the determination of that the braking pressure should be regulated, the operation of the actuator A is controlled by the controller C.

If it is determined at Step S8 that the vehicle is not in the state in which the traction control should be carried out and the regulation of the braking force is unnecessary, proceeding to Step S10, it is determined whether a predetermined time T, e.g., 500 m sec has lapsed from the time when the regulation of the braking force has become unnecessary. This time is the time required for the actuator A to regulate the output liquid pressure to a value which is equal to the output pressure from the master cylinder M at the end of the operation of the actuator A.

If it is determined at Step S10 that the predetermined time T has not yet lapsed, an output liquid pressure from the actuator A is established at Step S11. This output liquid pressure is established so that the output liquid pressure from the liquid pressure generating means M at the end of the operation of the actuator A, is equal to a value evaluated based on the detection by the operation-input detector 29, or to a directly detected value.

If it is determined at Step S10 that the given time T has been lapsed, it is determined at Step S12 that the electromagnetic switchover valve V should be deenergized into the first state to connect the wheel brake B to the master cylinder M. Thereafter, the output of liquid pressure from the actuator A is stopped at Step S13.

The operation of this embodiment will be described below. The controller C controls the switching operation of the electromagnetic switchover valve V, such that it is determined, depending upon the behavior of the vehicle or the wheel, whether the regulation of the braking force is required. When regulation of the braking force is required, an electrical command signal to be applied to the actuator A, and the electromagnetic switchover valve V is switched from the first state provided when the regulation of the braking force is not required, to the second state. Thus, during normal braking when the regulation of the braking force is not required, the output from the master cylinder M for outputting a liquid pressure dependent upon manual operation, is applied to the wheel brake B. When regulation of the braking force is required, the output liquid pressure from the actuator A for outputting a liquid pressure dependent upon an electrical command signal output from the controller C, is applied to the wheel brake B. Therefore, during normal braking, the electromagnetic switchover valve V is in its deenergized state, and the actuator A is also in its deactivated state. Thus, the frequency of operation of the electromagnetic switchover valve V and the actuator A can be reduced. Moreover, a stroke accumulator for providing a braking feeling is not required by the fact that the output pressure from the master cylinder M is applied to the wheel brake during the normal braking.

Herein, the relationship between the activation and deactivation of the actuator A, the energization and deenergization of the electromagnetic switchover valve V and the output liquid pressure from the master cylinder M and the actuator A is as shown in FIG. 3. More specifically, when the anti-lock control is operating, the actuator A is in its activated state, as shown by (a) in FIG. 3; the electromagnetic switchover valve V is energized into the second state, as shown by (b) in FIG. 3; and the output from the actuator A is controlled in an increased or decreased manner, as shown by (c) in FIG. 3, whereby the braking pressure of the wheel brake is controlled in an increased or decreased manner. During this time, the output pressure from the master cylinder M is not applied to the wheel brake. At a time point $t_1$ when the possibility of locking of the wheel has been reduced and it is determined that the anti-lock brake control may be finished, i.e., when it is determined that the operation of the actuator A may be finished, an electrical command signal for equalizing the output liquid pressure from the actuator A to the evaluated value or the detected value of the output liquid pressure from the master cylinder M is applied from the controller C to the actuator A, and the actuator A continues to be operated until the given time T has lapsed from the time point $t_1$. At a time point $t_2$ after the lapse of the given time T, the actuator A is brought into its nonoperative state and at the same time, the electromagnetic switchover valve V is switched from the second state to the first state. Therefore, when the master cylinder M is connected to the wheel brake B as a result of the switching of the electromagnetic switchover valve V from the second state to the first state, the liquid pressure in the wheel brake B is substantially equal to the output liquid pressure from the master cylinder M. Thus, a sense of incompatibility due to kick-back or reduction of the repulsion force of the brake pedal 1 is not produced in response to the switching of the connected state.

In an alternative embodiment, the electromagnetic switchover valve means may be comprised of a normally-closed electromagnetic switchover valve interposed between the actuator A and the wheel brake B, and a normally-opened electromagnetic switchover valve interposed between the master cylinder M and the wheel brake B.

Although the embodiment of the present invention has been described in detail, it will be understood that the present invention is not limited to the above-described embodiment, and various modifications may be made without departing from the spirit and scope of the invention defined in claims.

What is claimed is:

1. A brake system for a vehicle, said brake system comprising:

(a) liquid pressure generating means for generating liquid pressure for braking dependent upon a manual operation;

(b) actuator means for generating liquid pressure for braking dependent upon an electrical command signal;

(c) switchover valve means switchable between a first state in which a brake is connected only to said liquid pressure generating means and liquid pressure from said liquid pressure generating means is applied to the brake and a second state in which the brake is connected only to said actuator means and liquid pressure from said actuator means is applied to said brake;

(d) motion detector means for detecting at least one motion vehicle condition;

(e) controller means coupled to the output of said motion detector means and to the inputs of said actuator means and said switchover valve means, said controller means determining if a regulation of braking force is required as a function of the output of said motion detector means, determining an amount of braking force required to be generated by said brake, switching said switchover valve means between said first state and said second state dependent upon whether regulation of braking force is required, wherein when regulation of the braking force is required, switching said switchover valve means to the second state and determining and applying to the actuator means an electrical command signal dependent upon said required amount of braking force such that the brake is operated by said actuator means, and when regulation of the braking force is not required, switching the switchover valve to the first state such that the brake is operated by said liquid pressure generating means.

2. A brake system for a vehicle as set forth in claim 1, wherein the regulation of the braking force includes anti-lock braking control.

3. A brake system as set forth in claim 2, wherein the regulation of the braking force further includes traction control.

4. A brake system as set forth in claim 1, wherein said switchover valve means is an electromagnetic switchover valve.

5. A brake system as set forth in claim 1, wherein said liquid pressure generating means is a master cylinder.

6. A brake system as set forth in claim 1, wherein said controller means further determines when a regulation operation of said actuator means is completed and then applies an equalizing electrical command signal to said actuator means for equalizing the liquid pressure of said actuator means with the liquid pressure of said liquid pressure generating means and then generates a signal for switching said switchover valve means from said second state to said first state.

7. A brake system as set forth in claim 1, wherein said actuator means is deactivated when the liquid pressure generating means generates liquid pressure for braking.

8. A brake system for a vehicle, said brake system comprising:

(a) liquid pressure generating means for generating liquid pressure for braking dependent upon a manual operation;

(b) actuator means for generating liquid pressure for braking dependent upon an electrical command signal;

(c) switchover valve means switchable between a first state in which a brake is connected to said liquid pressure generating means and a second state in which the brake is connected to said actuator means;

(d) detector means for detecting at least one vehicle condition;

(e) controller means coupled to the output of said detector means and to the inputs of said actuator means and said switchover valve means, said controller means determining if a regulation of braking force is required as a function of the output of said detector means, switching said switchover valve means between said first state and said second state dependent upon whether regulation of braking force is required, wherein when regulation of the braking force is required, switching said switchover valve means to the second state and determining and applying an electrical command signal to the actuator means, and when regulation of the braking force is not required, switching the switchover valve to the first state such that the brake is operated by said liquid pressure generating means;

wherein said controller means further determines when a regulation operation of said actuator means is completed and then applies an equalizing electrical command signal to said actuator means for equalizing the liquid pressure of said actuator means with the liquid pressure of said liquid pressure generating means and then generates a signal for switching said switchover valve means from said second state to said first state; and wherein applying the equalizing electrical command signal to said actuator means for equalizing the liquid pressure of said actuator means and said liquid pressure generating means comprises determining if a predetermined time has elapsed from the completion of the regulation operation of the actuator means, continuing the operation of said actuator means until the predetermined time period has elapsed and switching said switchover valve means from said second state to said first state when said predetermined time period has elapsed.

9. A brake system for a vehicle, said brake system comprising:

(a) liquid pressure generating means for generating liquid pressure for braking dependent upon a manual operation;

(b) actuator means for generating liquid pressure for braking dependent upon an electrical command signal;

(c) switchover valve means switchable between a first state in which a brake is connected to said liquid pressure generating means and a second state in which the brake is connected to said actuator means;

(d) detector means for detecting at least one vehicle condition;

(e) controller means coupled to said detector means, said actuator means and said switchover valve means, said controller means determining when a regulation operation of said actuator means is completed and then applying an equalizing electrical command signal to said actuator means for equalizing the liquid pressure of said actuator means with the liquid pressure of said liquid pressure generating means and then generating a signal for switching said switchover valve means from said second state to said first state;

wherein applying the equalizing electrical command signal to said actuator means for equalizing the liquid pressure of said actuator means and said liquid pressure generating means comprises determining if a predetermined time has elapsed from the completion of the regulation operation of the actuator means, continuing the operation of said actuator means until the predetermined time period has elapsed and switching said switchover valve means from said second state to said first state when said predetermined time period has elapsed.

10. A brake system for a vehicle, said brake system comprising:

(a) liquid pressure generating means for generating liquid pressure for braking dependent upon a manual operation;

(b) actuator means for generating liquid pressure for braking dependent upon an electrical command signal;

(c) switchover valve means switchable between a first state in which a brake is connected to said liquid pressure generating means and liquid pressure from said liquid pressure generating means is applied to the brake and a second state in which the brake is connected to said actuator means and liquid pressure from said actuator means is applied to said brake;

(d) motion detector means for detecting at least one motion vehicle condition;

(e) controller means coupled to said motion detector means, said actuator means and said switchover valve means, said controller means determining an amount of braking force required to be generated by said brake, applying to said actuator means an electrical command signal dependent upon said required amount of braking force, determining when a regulation operation of said actuator means is completed and then applying an equalizing electrical command signal to said actuator means for equalizing the liquid pressure of said actuator means with the liquid pressure of said liquid pressure generating means and then generating a signal for switching said switchover valve means from said second state to said first state.

11. A brake system as set forth in claim 8, wherein said actuator means is deactivated when the liquid pressure generating means generates liquid pressure for braking.

* * * * *